(12) United States Patent
Horvath et al.

(10) Patent No.: US 12,001,436 B2
(45) Date of Patent: Jun. 4, 2024

(54) METHOD OF AND SYSTEM FOR CAUSING A SMART CONNECTED DEVICE TO EXECUTE CONTENT UPON SENSING A LINK TRIGGER

(71) Applicant: GETSTARTED INC., Toronto (CA)

(72) Inventors: Norbert Horvath, Valletta (MT); Daniel Yhip, Toronto (CA)

(73) Assignee: GETSTARTED INC., Toronto (CA)

( * ) Notice: Subject to any disclaimer, the term of this patent is extended or adjusted under 35 U.S.C. 154(b) by 326 days.

(21) Appl. No.: 17/572,161

(22) Filed: Jan. 10, 2022

(65) Prior Publication Data

US 2022/0309059 A1 Sep. 29, 2022

Related U.S. Application Data

(60) Provisional application No. 63/170,941, filed on Apr. 5, 2021, provisional application No. 63/169,508, filed on Apr. 1, 2021, provisional application No. 63/167,311, filed on Mar. 29, 2021.

(51) Int. Cl.
| | |
|---|---|
| *G06F 16/00* | (2019.01) |
| *G06F 16/22* | (2019.01) |
| *G06F 16/2457* | (2019.01) |
| *G06F 16/25* | (2019.01) |

(52) U.S. Cl.
CPC ...... *G06F 16/2457* (2019.01); *G06F 16/2246* (2019.01); *G06F 16/2282* (2019.01); *G06F 16/252* (2019.01)

(58) Field of Classification Search
CPC ............. G06F 16/2246; G06F 16/2282; G06F 16/2457; G06F 16/252
See application file for complete search history.

(56) References Cited

U.S. PATENT DOCUMENTS 9,720,887 B2 * 8/2017 Pappu .................. G06F 40/134

OTHER PUBLICATIONS

Azim et al., "uLink:Enabling User-Defined Deep Linking to App Content," MobiSys'16, Jun. 25-30, 2016, ACM, pp. 305-318. (Year: 2016).*
Ebersohn, "Hyperlinking and Deep-Linking," The Quarterly Law Review For People In Business, JBL, vol. 11, part 2, pp. 73-77. (Year: 2003).*

* cited by examiner

*Primary Examiner* — Cheryl Lewis
(74) *Attorney, Agent, or Firm* — Harness, Dickey & Pierce, PLC

(57) ABSTRACT

There is provided a method and system for causing a smart connected device such as a smart speaker to execute content upon a link trigger being sensed. The content to be executed is received and organized in a content tree, and at least one deep hyperlink accessible by a given electronic device is generated. The link trigger associated with a sensing action of the given electronic device is generated for the deep hyperlink. The content, the deep hyperlink and the link trigger are stored in a database. An indication of the deep hyperlink having been accessed by the given electronic device by sensing the link trigger is received, and the content associated with the deep hyperlink and device information associated with the smart connected device are received. An indication of the content is transmitted, the transmitting thereby causing the smart connected device to execute the content.

20 Claims, 4 Drawing Sheets

METHOD OF AND SYSTEM FOR CAUSING A SMART CONNECTED DEVICE TO EXECUTE CONTENT UPON SENSING A LINK TRIGGER

CROSS-REFERENCE TO RELATED APPLICATIONS

The present application claims priority to U.S. Provisional Patent Application Ser. No. 63/167,311 filed on Mar. 28, 2021, U.S. Provisional Patent Application Ser. No. 63/169,508 filed on Apr. 1, 2021 and U.S. Provisional Patent Application Ser. No. 63/170,941 filed on Apr. 5, 2021, the content of which is hereby incorporated by reference in its entirety.

FIELD

The present technology relates to voice-enabled electronic devices in general and more specifically to methods and systems for causing a smart connected device to execute content upon sensing a link trigger.

BACKGROUND

Smart speakers having access to intelligent virtual assistant (IVA) services are devices that respond to user queries, which may be in the form of spoken queries, by searching for a response to the query of the user, for example, using the internet and provide the response to the user, often in the form of an audible response such as synthesized speech. Smart speakers having access to IVA services may also respond to user commands to play audio from a specified audio source, for example, an internet radio station, or to control a smart device, for example, to turn on or off a light or change a setting of another smart device that the smart speaker has access to, for example, via Wi-Fi® signals either directly or through an internet router of the user.

Queries or commands are typically provided to an IVA through a smart speaker or other device by a user after the user presses a button or says a wake up word or phrase, for example, "Alexa" that indicates to the smart speaker or other device that the user is addressing the IVA.

IVA enabled devices are becoming more prevalent with various companies providing competing devices, for example, the Echo™ device from Amazon, Google Home™ device from Google, and various devices incorporating the Siri™ application from Apple.

While the aforementioned IVA enabled devices are becoming more prevalent, users are limited to verbal commands to initiate and perform a dialogue with navigable content, media, services, and transactions for products and services.

SUMMARY

It is an object of the present technology to ameliorate at least some of the inconveniences present in the prior art. One or more embodiments of the present technology may provide and/or broaden the scope of approaches to and/or methods of achieving the aims and objects of the present technology.

Developers of the present technology have appreciated that for voice-enabled smart speakers (or, smart connected devices), there does not exist a means for brands, services, and/or creators to make every position of a data-structure discoverable and accessible on any smart speaker (or smart connected device), which may cause content providers and users to abandon or delay their adoption of such technologies, as creation and navigation of voice enabled content may be cumbersome and require knowledge of different programming interfaces for different types of IVAs and smart connected devices.

Developers of the present technology thus propose a platform for providing instant-content payload to an end user, and for providing instant access to all positions of a data-structure via Hypertext Transfer Protocol (HTTP) and a public Application Programming Interface (API). The platform comprises a data structure that facilitates a discoverable API to which any smart speaker or smart connected device platform can connect.

In one or more embodiments, the present technology provides a visual builder which enables, among other things, a user to build a system commensurate of the core parts of a conversation composed by question and answer dialogue, enables navigation of thought by voice, enables offering a commercial touch point that enables payment for content, services, and products through the aforementioned question and answer dialogue, as well as link to a payment with a badge and/or integration of third party extensions.

Thus, one or more embodiments of the present technology are directed to a method of and a system for causing a smart connected device to execute content upon sensing a link trigger.

In accordance with a broad aspect of the present technology, there is provided a method for causing a smart connected device to execute content, the method being executed by at least one processor. The method comprises: receiving an indication the content to be executed by the smart connected device, generating, for the content, a deep hyperlink accessible by a given electronic device, generating a link trigger for the deep hyperlink, the link trigger being associated with a sensing action of a sensor of the given electronic device, storing, in a database connected to the processor, the content, the deep hyperlink and the link trigger, receiving an indication of the deep hyperlink having been accessed by the given electronic device by sensing the link trigger. The method comprises receiving, based on the indication of the deep hyperlink, from the database, the content associated with the deep hyperlink and device information associated with the smart connected device, and transmitting an indication of the content, the transmitting thereby causing the smart connected device to execute the content.

In one or more embodiments of the method, the content is part of a content tree corresponding to a hierarchical data structure, the content corresponding to a content node in the content tree.

In one or more embodiments of the method, the processor is connected to a content provider device, and the receiving the content to be executed by the smart connected device comprises receiving, from the content provider device, the content to be executed by the smart connected device.

In one or more embodiments of the method, the method further comprises, prior to receiving the content: providing a graphical user interface (GUI) to the content provider device for receiving the content.

In one or more embodiments of the method, the content tree is organized as a question and answer dialogue, and the content corresponds to a given question.

In one or more embodiments of the method, the method further comprises, prior to the generating, for the content, the deep hyperlink accessible by the given electronic device: generating the content node in the content tree, the content node being associated with a content provider identifier, a space identifier, a node identifier, a media type, a device type, and a parent node identifier, storing the content comprises storing the content node as a key value in the database.

In one or more embodiments of the method, the processor is connected to a server associated with the smart connected device, and the transmitting the indication of the content comprises: transmitting an indication of the smart connected device to the server, the transmission causing the server to process the content to obtain executable content and to relay the executable content to the smart connected device.

In one or more embodiments of the method, the smart connected device comprises a smart speaker.

In one or more embodiments of the method, the sensor comprises at least one of: an input/output sensor, a camera, a communication interface, an accelerometer, an ambient light sensor, a proximity sensor, a gyroscope, a compass, a hall effect sensor, a barometer, and a fingerprint sensor.

In one or more embodiments of the method, the receiving the indication of the deep hyperlink having been accessed by the given electronic device by sensing the link trigger comprises receiving an indication of a smart connected device type.

In one or more embodiments of the method, the method further comprises: tracking user interactions of the smart connected device with the content, and storing, in the database, the user interactions.

In accordance with a broad aspect of the present technology, there is provided a system for causing a smart connected device to execute content. The system comprises: at least one processor, and a non-transitory storage medium operatively connected to the at least one processor, the non-transitory storage medium storing computer-readable instructions. The at least one processor, upon executing the computer-readable instructions, is configured for: receiving an indication of the content to be executed by the smart connected device, generating, for the content, a deep hyperlink accessible by a given electronic device, generating a link trigger for the deep hyperlink, the link trigger being associated with a sensing action of a sensor of the given electronic device, storing, in the non-transitory storage medium, the content, the deep hyperlink and the link trigger. The processor is configured for receiving an indication of the deep hyperlink having been accessed by the given electronic device by sensing the link trigger, receiving, based on the indication of the deep hyperlink, from the non-transitory storage medium, the content associated with the deep hyperlink and device information associated with the smart connected device, and transmitting the indication of the content, the transmitting thereby causing the smart connected device to execute the content.

In one or more embodiments of the system, the content is part of a content tree corresponding to a hierarchical data structure, the content corresponding to a content node in the content tree.

In one or more embodiments of the system, the processor is connected to a content provider device, and the receiving the content to be executed by the smart connected device comprises receiving, from the content provider device, the content to be executed by the smart connected device.

In one or more embodiments of the system, the processor is further configured for, prior to receiving the content: providing a graphical user interface (GUI) to the content provider device for receiving the content.

In one or more embodiments of the system, the content tree is organized as a question and answer dialogue, and the content corresponds to a given question.

In one or more embodiments of the system, the processor is further configured for, prior to the generating, for the content, the deep hyperlink accessible by the given electronic device: generating the content node in the content tree, the content node being associated with a content provider identifier, a space identifier, a node identifier, a media type, a device type, and a parent node identifier, storing the content comprises storing the content node as a key value in the non-transitory storage medium.

In one or more embodiments of the system, the processor is connected to a server associated with the smart connected device, and the transmitting the indication of the content comprises: transmitting an indication of the smart connected device to the server, the transmission causing the server to process the content to obtain executable content and to relay the executable content to the smart connected device.

In one or more embodiments of the system, the smart connected device comprises a smart speaker.

In one or more embodiments of the system, the sensor comprises at least one of: an input/output sensor, a camera, a communication interface, an accelerometer, an ambient light sensor, a proximity sensor, a gyroscope, a compass, a hall effect sensor, a barometer, and a fingerprint sensor.

In one or more embodiments of the system, the receiving the indication of the deep hyperlink having been accessed by the given electronic device by sensing the link trigger comprises receiving an indication of a smart connected device type.

In one or more embodiments of the system, the processor is further configured for: tracking user interactions of the smart connected device with the content, and storing, in the non-transitory storage medium, the user interactions.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
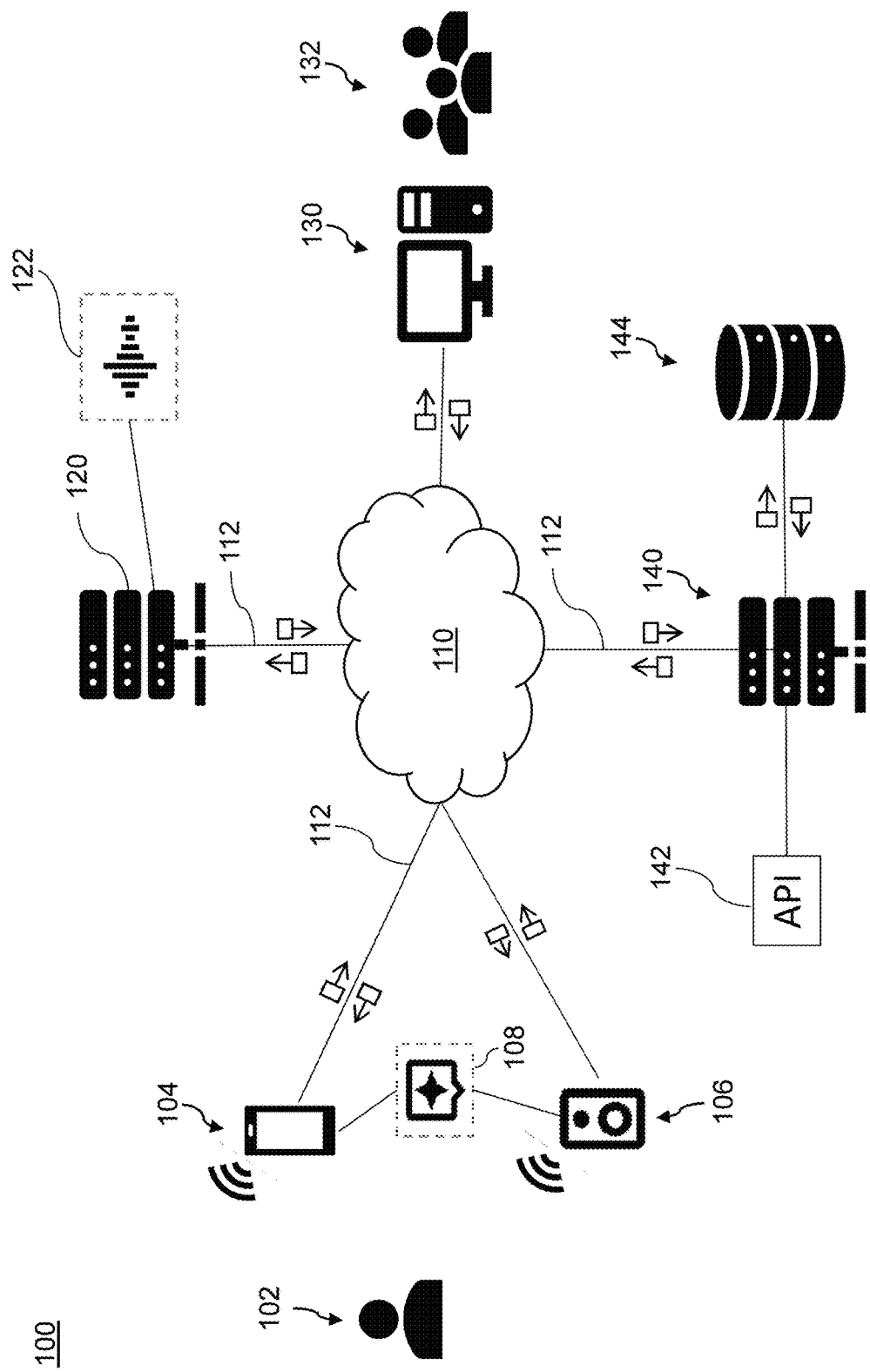
FIG. 1 depicts a schematic diagram of a communication system in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In one or more non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Communication System

Referring to FIG. 1, there is depicted a schematic diagram of a communication system 100, which will be referred to as the system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. It will be appreciated that various implementations of the present technology may be of a greater complexity.

The system 100 comprises inter alia a user device 104, a smart speaker 106, an IVA server 120, content provider devices 130, and a server 140 communicatively connected over a communication network 110 via respective communication links 112.

User Devices

As previously mentioned, the system 100 comprises the user device 104. The implementation of the user device 104 is not particularly limited, but as an example, the user device 104 may be implemented as a personal computer (desktops, laptops, netbooks, etc.), a wireless communication device (such as a smartphone, a cell phone, a tablet, a smart speaker and the like), and the like. As such, the user device 104 can sometimes be referred to as an "electronic device", "end user device", "client electronic device" or simply "device". It should be noted that the fact that the user device 104 is associated with the user 102 does not need to suggest or imply any mode of operation—such as a need to log in, a need to be registered, or the like.

The user device 104 comprises comprising various hardware components including one or more single or multi-core processors, a graphics processing unit (GPU), a solid-state drive, a random access memory, a display interface, and an input/output interface.

Communication between the various components of the user device 104 may be enabled by one or more internal and/or external buses (e.g. a PCI bus, universal serial bus, IEEE "Firewire" bus, SCSI bus, Serial-ATA bus, etc.), to which the various hardware components are electronically coupled. The input/output interface may be coupled to a touchscreen and/or to the one or more internal and/or external buses. The touchscreen may be part of the display. In one or more embodiments, the touchscreen is the display. The touchscreen comprises touch hardware (e.g., pressure-sensitive cells embedded in a layer of a display allowing detection of a physical interaction between a user and the display) and a touch input/output controller allowing communication with the display interface and/or the one or more internal and/or external buses. In one or more embodiments, the input/output interface may be connected to a keyboard (not shown), a mouse (not shown) or a trackpad (not shown) allowing the user to interact with the electronic device in addition or in replacement of the touchscreen It is contemplated that the user device 104 comprises hardware and/or software and/or firmware (or a combination thereof), as is known in the art, in order to allow the user 102 to use various sensors of the user device 104 to detect "triggers". In one or more embodiments, triggers cause the user device 104 to access a deep hyperlink. A deep hyperlink may be accessed directly by the user device 104 (e.g., via a browser application executed by the user device 104) or may be accessed indirectly by the user device 104 upon sensing a trigger with one of its various sensors comprising one or more of: an input/output sensor, a camera, a communication interface, an accelerometer, an ambient light sensor, a proximity sensor, a gyroscope, a compass, a hall effect sensor, a barometer, and a fingerprint sensor. It should be understood that the user device 104 may be preconfigured to access such deep hyperlinks via the triggers. As a non-limiting example, the user 102 may have installed an application on the user device 104 and may have authorized the application to use one or more sensor of the user device 104 to sense triggers.

The system 100 also comprises a smart connected device in the form of the smart speaker 106 associated with the user 102.

The smart speaker 106 comprises a speaker and a voice command device (e.g. including a microphone) with an integrated virtual assistant (IVA) functionality. The smart speaker 106 may comprise one or more communication interfaces such as Wi-Fi®, Bluetooth®, and the like. It will be appreciated that in some embodiments, the smart speaker 106 may be connected to the communication network 110 via the user device 104.

The user device 104 and/or the smart speaker 106 also comprises hardware and/or software and/or firmware (or a combination thereof), as is known in the art, in order to execute an intelligent virtual assistant (IVA) application 108.

The purpose of the IVA application 108, also known as an intelligent personal assistant (IPA) and a "chatbot", is to inter alia: (i) enable the user 102 to submit queries or commands in a form of spoken utterances (e.g., sound indications) to a smart device (e.g. smart speaker 106 and/or user device 104) executing the IVA application 108; and (ii) provide to the user 102 responses in a form of spoken utterances (e.g., sound indications) and/or execute actions based on the commands contained in the sound indications. In one or more embodiments, the IVA application 108 provides spoken utterances upon receiving indications to do so from other devices, such as the direct linking server 140, as will be explained below.

Sound indications (such as spoken utterances) from the user 102 may be detected by the user device 104 and/or the smart speaker 106, which, in response, is configured to provide response sound indications (such as spoken utterances or "machine-generated utterances") and/or to execute actions based on the commands contained in the sound indications. Thus, the user 102 may interact with the user device 104 and/or the smart speaker 106 so as to have a conversation. In one or more embodiments, the IVA application 108 may cause the user device 104 and/or the smart speaker 106 to execute actions based on the sound indications provided by the user 102. The user 102 may for example use the user device 104 and/or the smart speaker 106 to perform audio playback of music, audiobooks, control home automation devices, ask questions, perform a search, controlling parameters of connected electronic devices, and the like. It will be appreciated that the output provided by the user device 104 and/or the smart speaker 106 may not always be in audio form, and may include as a non-limiting example, visual output (e.g. on a display screen), printed output (e.g. using a printer), or a combination thereof as well as other type of feedback via components of the user device 104 and/or the smart speaker 106.

Submission of queries/commands and provision of responses may be executed by the IVA application 108 via what is known as "a natural language user interface" (not separately depicted).

The natural language user interface of the IVA application 108 may be any type of computer-human interface where linguistic phenomena such as words, phrases, clauses and the like act as user interface controls for accessing, extracting, selecting, modifying or otherwise generating data in or by the IVA application 108.

For example, when spoken utterances of the user 102 (e.g., the sound indications) are detected by the user device 104 and/or the smart speaker 106, the IVA application 108 may employ its natural language user interface in order to analyze the spoken utterances of the user 102 and extract data therefrom, which data is indicative of queries or commands of the user 102. In one or more embodiments, the IVA application 108 may transmit data to the IVA server 120 for processing thereof, which may transmit back processed data for execution by the user device 104 and/or the smart speaker 106.

Also, data indicative of responses to be provided to the user 102, which may be received or generated by the user device 104, is analyzed by the natural language user interface of the IVA application 108 in order to provide or reproduce spoken utterances (e.g., sound indications) indicative of the responses to the user queries or commands.

It will be appreciated that in one or more other embodiments of the present technology, the functionality of the smart speaker 106 may be provided entirely by the user device 104 of the user 102, i.e., the user device 104 may act as a smart speaker by executing the IVA application 108.

Communication Network

In the illustrative example of the system 100, the user device 104 is communicatively coupled to a communication network 110 for accessing and transmitting data packets to/from the IVA server 120 and/or the server 140 and/or other web resources (not depicted). In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the user device 104 and the communication network 110 is implemented will depend inter alia on how the user device 104 is implemented.

Merely as an example and not as a limitation, in those embodiments of the present technology where the user device 104 is implemented as a wireless communication device (such as a smartphone), the communication link can be implemented as a wireless communication link (such as but not limited to, a 3G communication network link, a 4G communication network link, a 5G communication network link, Wireless Fidelity, or WiFi® for short, Bluetooth® and the like). In those examples where the user device 104 is implemented as a notebook computer, the communication link can be either wireless (such as Wireless Fidelity, or WiFi® for short, Bluetooth® or the like) or wired (such as an Ethernet based connection).

IVA Server

In one or more embodiments, the system 100 comprises an IVA server 120 for processing data provided by the IVA application 108 executed by the smart speaker 106 and/or the user device 104. In one or more alternative embodiments, the processing may be performed locally by the smart speaker 106 and/or the user device 104.

The IVA server 120 may be implemented as a conventional computer server. As a non-limiting example, the IVA server 120 can be implemented as a Dell™ PowerEdge™ Server running the Microsoft™ Windows Server™ operating system. Needless to say, the IVA server 120 can be implemented in any other suitable hardware, software, and/or firmware, or a combination thereof. In the depicted non-limiting embodiments of the present technology, the IVA server 120 is a single server. In alternative non-limiting embodiments of the present technology, the functionality of the IVA server 120 may be distributed and may be implemented via multiple servers.

In some non-limiting embodiments of the present technology, the IVA application 108 is configured to transmit data including recorded audio to the IVA server 120 for processing thereof via an IVA functionality 122.

The IVA functionality 122 comprises various components that may allow implementing the above-mentioned functionalities thereof.

The IVA functionality 122 may implement a natural language processing (NLP) functionality. The NLP functionality may be configured to: (i) receive an audio signal; (ii) retrieve the recording of the spoken utterance contained therein; (iii) process the spoken utterance to extract user commands that were issues as part of the sound indications.

To that end, the NLP functionality is configured to convert speech to text using a speech to text algorithm (not depicted). In accordance with the various non-limiting embodiments of the present technology, the speech to text algorithm may be based on one or more of: hidden Markov models, dynamic time wrapping (DTW) based speech recognition algorithms, end to end automatic speech recognition algorithms, various Neural Networks (NN) based techniques, and the like.

In some non-limiting embodiments of the present technology, the transmittal of the signal and the recording of the spoken utterance contained therein to the IVA server 120 enables the IVA server 120 to process the recording of the spoken utterance to extract commands contained therein and to generate instructions to enable the user device 104 and/or the smart speaker 106 to execute actions that are responsive to the user commands. The IVA server 120 may then transmit the data to devices executing the IVA application 108 such as the user device 104 and/or the smart speaker 106.

It should be noted that in alternative non-limiting embodiments of the present technology, the processing of the recording of the spoken sound indications can be executed locally by user device 104 and/or the smart speaker 106. In these alternative non-limiting embodiments of the present technology, the system 100 can be implemented without the need for the server 140. Within these alternative non-limiting embodiments of the present technology, the functionality of the IVA server 120 to be described herein below can be implemented as part of the user device 104 and/or the smart speaker 106.

In these alternative non-limiting embodiments of the present technology, the user device 104 and/or the smart speaker 106 comprises the required hardware, software, firmware or a combination thereof to execute the IVA functionality 122.

Content Provider Devices

The system 100 comprises one or more content provider devices 130 (only one shown) each associated with a respective content provider 132.

The content provider devices 130 are implemented as regular electronic devices which may connect to the communication network 110, such as a desktop computer, a laptop computer, a tablet, a smartphone, etc.

The content provider 132 provides, via the content provider device 130, digital content that is accessible by users via their electronic devices such as the user 104 via the user device 104 and/or the smart speaker 106. It will be appreciated that the content provider 132 may be one or more users, an agency, a company, a financial institution, a government agency, etc.

It will be appreciated that the type of content provided by the content provider 132 is not limited and may include, as a non-limiting example, any type of digital content that may be executed by smart connected devices such as the smart speaker 106. Thus the content provided by the content provider 132 may be multimodal and may include any digital data that is convertible to text and audio or that may be converted for execution by a smart connected device such as the smart speaker 106.

In the context of the present technology, the content provider 132 does not need to specifically program content for the content to be playable by a smart device but may instead use the API 142 provided by the direct linking server 140, as will be explained below.

The content provider 132 may for example want to provide content that may be integrated, via the smart speaker 106, into:

third party products such as custom voices, backgrounds, images, and/or avatars to the smart speaker device;

third party systems for the purpose of immersive experiences such as augmented reality (AR), virtual reality (VR), television second screen, electronic gaming, real world gaming, live events (sports, music, entertainment, academia, education, spiritual, health & wellness, not-for-profit, charity, political, trade shows, live shopping, agricultural, cultural, and local community) and conferences;

real world experiences to enable real estate and real estate sales support;

real world experiences such as to enable internet of things (IoT);

workflow automations including but not limited to link triggered multi-step, multi-system routines;

third party systems for the purpose of identity authentication and esignature delivery;

real world experiences such as retail goods instructions, re-orders, inventory updates, and customer support;

third party cashback services including, but not limited to providing timely and relevant discount information and affiliate linking;

real world experiences such as food and dining, for the purpose of ordering, paying, status updates, and booking;

telephony for automated customer care pre-processing;

digital experiences such as voice assisted eCommerce;

third party systems for the purpose of initiating security, privacy, validation, and/or authentication services;

existing user interfaces as (or creation of) an execution method of financial transaction mechanics such as sending, accepting, limiting, and/or cancelling fund transfers;

existing user interfaces as (or creation of) third party administrative tasks such as account balances, messages, account updates, account creation, account changes, and status updates; and existing user interfaces as (or creation of) third party systems for the purpose of end-to-end financial management, including but not limited to financial information gathering, planning, advice, management, execution of financial management, and/or financial counsel.

In one or more embodiments, the content provider 132 may access, via the content provider device 130, the API 142 of the direct linking server 140 to provide content thereto. The content, which may be for example in a structured format (e.g. relatively organized), may be provided such that it can be discoverable via voice via the IVA application 108.

Direct Linking Server

As previously mentioned, the system 100 also comprises the direct linking server 140 that can be implemented as a conventional computer server. The direct linking server 140 will now be referred to as the server 140. In an example of an embodiment of the present technology, the server 140 can be implemented as a Dell™ PowerEdge™ Server running the Microsoft™ Windows Server™ operating system. Needless to say, the server 140 can be implemented in any other suitable hardware, software, and/or firmware, or a combination thereof. In the depicted non-limiting embodiments of the present technology, the server 140 is a single server. In alternative non-limiting embodiments of the present technology, the functionality of the server 140 may be distributed and may be implemented via multiple servers.

The server 140 is configured to inter alia: (i) provide an application programming interface (API) 142 accessible by the content provider 132 via the content provider devices 130; (ii) receive, from the content provider device 130, content to be executed on smart connected devices such as the smart speaker 106; (iii) organize and generate content payloads in the form of content trees; (iv) generate deep hyperlinks for each of the content payload nodes of the content tree; (v) generate link triggers for one or more of the content nodes, the link triggers to be sensed by user devices (e.g. the user device 104); (vi) store content trees associated deep hyperlinks and link triggers in the database 144; (vii) upon receiving an indication of a sensed link trigger from a user device, providing the content payload to smart connected devices (e.g. smart speaker 106) for execution thereof; and (viii) track user interactions with the content payload.

How the server 140 is configured to do so will be explained in more detail herein below.

In one or more alternative embodiments, the server 140 and the IVA server 120 may be implemented as a single server.

Database

A database 144 is directly connected to the server 140 however, in one or more alternative implementations, the database 144 may be communicatively coupled to the server 140 via the communication network 110 without departing from the teachings of the present technology. Although the database 144 is illustrated schematically herein as a single entity, it will be appreciated that the database 144 may be configured in a distributed manner, for example, the database 144 may have different components, each component being configured for a particular kind of retrieval therefrom or storage therein.

The database 144 may be a structured collection of data, irrespective of its particular structure or the computer hardware on which data is stored, implemented or otherwise rendered available for use. The database 144 may reside on the same hardware as a process that stores or makes use of the information stored in the database 144 or it may reside on separate hardware, such as on the server 140. The database 144 may receive data from the server 140 for storage thereof and may provide stored data to the server 140 for use thereof.

In the context of the present technology, the database 144 is configured to store inter alia: (i) for one or more content providers 132, content trees comprising content nodes and associated information; (ii) deep hyperlinks associated with each content nodes; (iii) link triggers associated with the content nodes and/or deep hyperlinks; (iv) information related to smart speaking devices; and (v) user interaction data related to the content trees.

Content Tree Generation and Payload Provision Procedure

Figure 3:
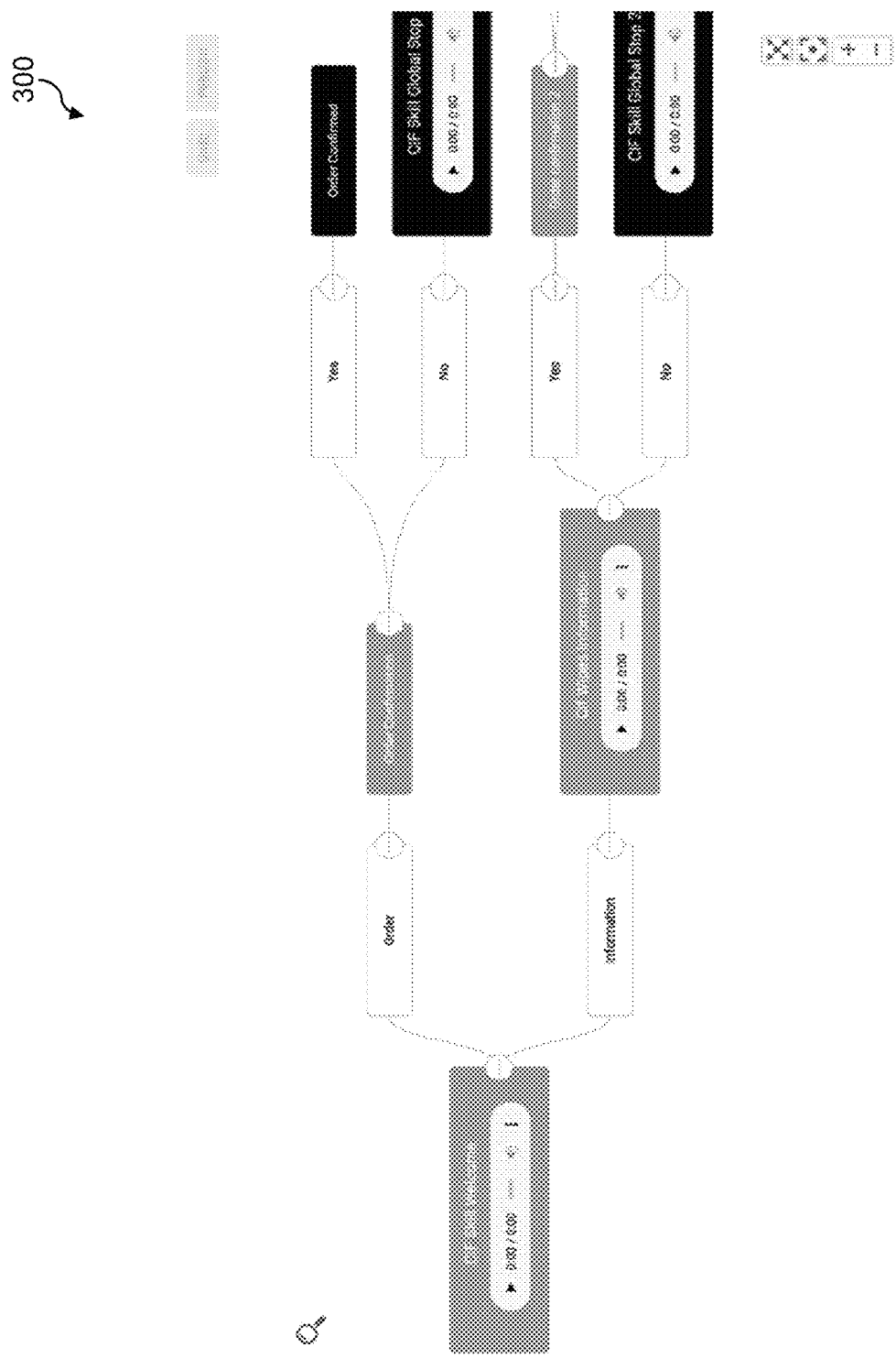
FIG. 3 depicts a schematic diagram of a graphical user interface for generating a content tree in accordance with one or more non-limiting embodiments of the present technology.

With reference to FIG. 3, there is shown a schematic diagram of a content tree generation procedure 200 and a content payload provision procedure 250 in accordance with one or more non-limiting embodiments of the present technology.

In one or more embodiments, the content tree generation procedure 200 and the content payload provision procedure 250 are executed within the system 100 by at least one processing device. In one or more alternative embodiments, at least a portion of each of the content tree generation procedure 200 and the content payload provision procedure 250 may be executed within a system having fewer devices, for example when a single device executes the functionality of a plurality of devices (e.g. a single server in place of the server 140 and the IVA server 120 and/or a single device in place of the user device 104 and the smart speaker 106).

Content Tree Generation Procedure

The purpose of the content tree generation procedure 200 is to generate content payloads executable by smart connected devices, where content payloads are associated with deep hyperlinks and link triggers such that content providers 132 may provide discoverable content in a device-agnostic manner that is easily accessible by various types of smart connected devices and which requires minimal device-specific programming knowledge from content providers 132. Thus, as a non-limiting example, the content provider 132 may provide content to be discoverable by different provides of smart devices such as the Echo™ device from Amazon, Google Home™ device from Google, and various devices incorporating the Siri™ application from Apple without specifically programming and adapting the content for each of the aforementioned devices.

During the content tree generation procedure 200, the server 140 generates a content tree 210 defining a content payload architecture accessible on a voice-activated device such as, but not limited to, the user device 104 and/or the smart speaker 106.

It is further contemplated that a content payload may be device-specific and may be executable by other types of smart connected devices such as Internet of Things (IoT) devices including home automation devices (e.g., cameras, lighting, appliances, etc.), wearables (e.g., smart watches, smart glasses, virtual reality headsets), and the like.

The server 140 is configured to receive content 205 to be executed on a smart connected device, and generate one or more content payloads as content nodes 212 within content tree 210.

Figure 2:
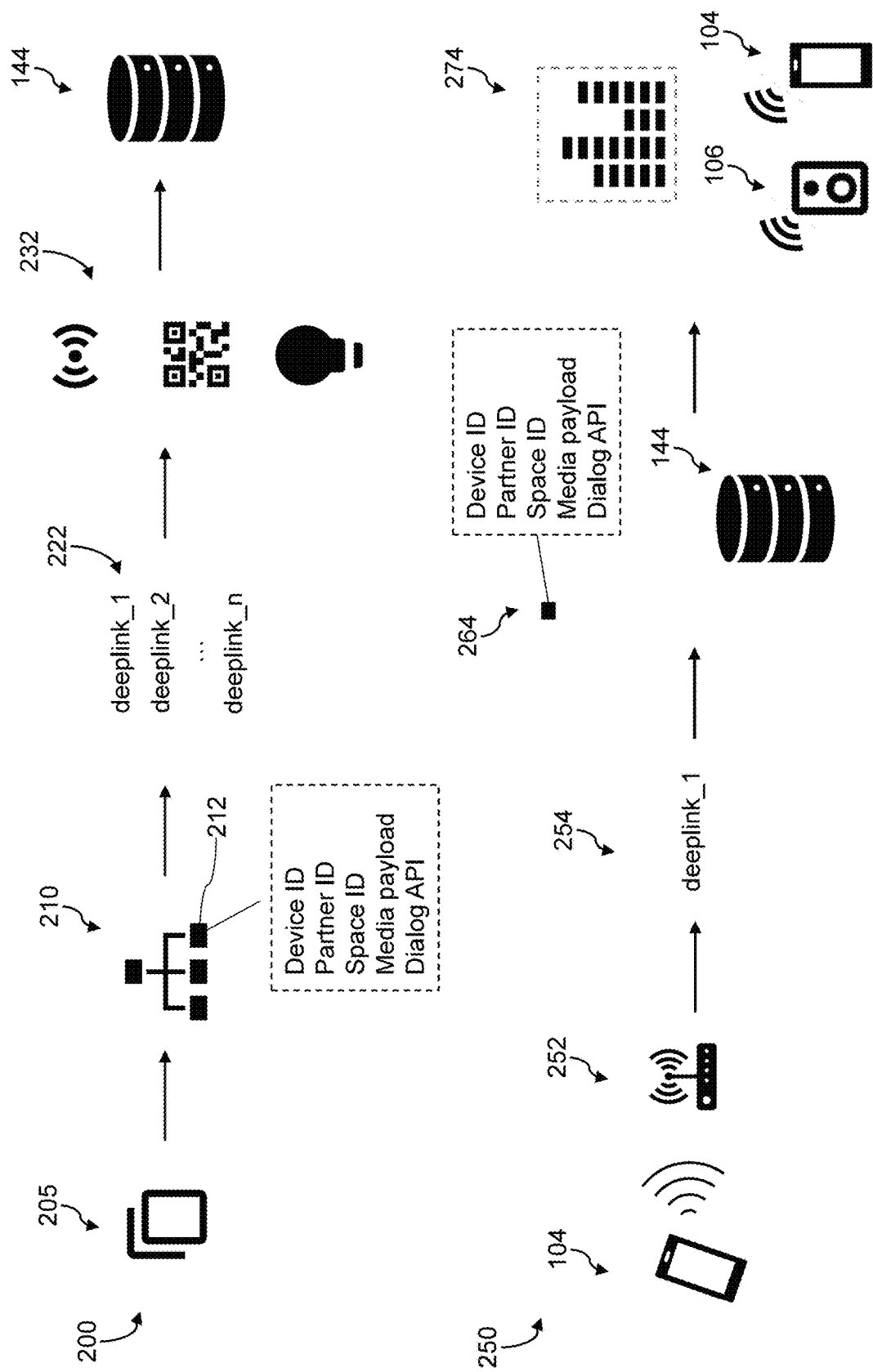
FIG. 2 depicts a schematic diagram of a content tree generation procedure and a content payload provision procedure in accordance with one or more non-limiting embodiments of the present technology.

The content tree 210 is a data structure simulating a hierarchical tree and comprises a set of linked content nodes 212 (only one numbered in FIG. 2). Each content node 212 in the content tree 210 has zero or more child nodes which are located below in the tree, and a node having a child is called a parent node. As a non-limiting example, the content tree 210 may represent a website, products organized in a hierarchical, services organized in a hierarchical structure, locations (e.g. countries, regions, cities, neighborhood), etc.

A content node 212 comprises a content payload (or a reference thereto), which is digital information of any kind that may be executed by a smart connected device. In one or more embodiments, a content node 212 may include any type of data that is executable by a voice-activated device such as the smart speaker 106 of the user 102 and may include any type of digital data that may be represented in audio form, such as but not limited to text, image, sensor data, etc.

Additionally or alternatively, a content node 212 may further comprise content payload data (or a reference thereto) executable by a specific type of smart connected device, for example a flashing light pattern or a specific light color for a smart bulb. It will be appreciated that the content data to be executed by the smart connected device may be in human understandable form, and may be processed to be executable by the smart connected device.

In one or more embodiments, the server 140 generates the content tree 210 based on information provided by one of the content providers 132. The server 140 may receive information for each content node of the content tree 210 via the API 142 over the communication network 110. In one or more embodiments, the server 140 is configured to generate a graphical representation of the content tree 210 based on the content nodes 212, which may be displayed to a content provider 132.

The server 140 may provide a graphical user interface (GUI) for generating the content tree 210, which may be accessible by the content provider 132 via the content provider device 130 to transmit information required to build the content tree 210 to the server 140. It will be appreciated that the content tree 210 enables a content provider 132 to structure content to be executed by smart devices in an intuitive manner. The content provide 132 may thus specify parent nodes, children nodes, the general content tree 210 structure, etc by using a tree structure.

A non-limiting example of a graphical user interface (GUI) 300 provided by the server 140 comprising a content tree with a set of linked nodes is shown in FIG. 3. The GUI 300 is the form a visual content tree builder, and enables a user or content provider to create, move, and delete content nodes. For example, a content subtree may correspond to a question and answer dialogue, with a given parent node corresponding to a question with different options, and each children node corresponding to a different option that the user 102 may chose to navigate via the user device 104 and/or the smart speaker 106 by using his voice in the content tree 210.

In one or more embodiments, the server 140 may generate the content tree 210 based on a markup language describing the general hierarchical structure of the content. Non-limiting examples of markup languages include Hypertext Markup Language (HTML), Extensible Markup Language (XML), LaTeX, and the like.

As a non-limiting example, the server 140 may generate the content tree 210 based on a RSS feed and/or Atom feed of the content provider 132.

In one or more other embodiments, the server 140 may generate the content tree 210 automatically by parsing different type of data. As a non-limiting example, the server 140 may generate a content tree 210 by parsing a website based on its document object model (DOM) and by extracting text information associated therewith, which the server 140 organizes based on the DOM to obtain a content tree 210. As another non-limiting example, the server 140 may generate the content tree 210 by parsing an XML file.

In one or more alternative embodiments, the server 140 may execute one or more machine learning models (not shown) having been trained to perform extraction and classification from text collections so as to generate a hierarchical content structure.

Each content node 212 of the content tree 210 comprises content payload and is associated with a content provider identifier, a space identifier, a node identifier, a media type, a device type, and a parent node identifier. The content provider identifier is a sequence of characters identifying the content provider 132, the space identifier is a sequence of characters identifying the content tree 210, the node identifier is a sequence of characters identifying the given content node 212 within the content tree 210, the parent node identifier identifies which node in the content tree 210 is a parent of the present node. The media type identifies a type of media associated with the content payload to be played on the smart voice-activated device. The media type is not limited and may include as a non-limiting example: music, a podcast, an audiobook, dialogue, advertisement, and the like. The device type identifies the type of smart device on which the content payload may be executed. For example, the device type may identify a brand, a model and device components and/or features compatible with the content payload of the content node 212.

In one or more embodiments, a given content provider 132 may organize the content tree 210 in the form of a conversation by linking nodes in a question and answer (Q-A) format. Once organized, the server 140 stores the content tree 210 in the database 144 in the form of key values which identify each node with a content provider identifier, a space identifier, a node identifier, a media type, a device type, and a parent node identifier.

The server 140 uses an abstraction layer to organize key values to generate a deep hyperlink 222 (only one numbered) for each node 212 in the content tree 210. Each deep hyperlink 222 is associated with a node payload of a content node 212, which initiates or activates the content on a voice-activated device such as the smart speaker 106.

Thus, each content node 212 is associated with a respective deep hyperlink 222 or direct link which enables a smart device to directly access the content payload of the content node 212. In this manner, a smart connected device may directly access specific content in the content tree 210 without being required to navigate through parent nodes of the specific content node 212, which enables, among other things, optimizing bandwidth and usage of computational resources within devices of the system 100.

In one or more embodiments, the server 140 generates one or more link triggers 232 (only one numbered) for a given deep hyperlink 222. A link trigger 232 causes a user device to access the deep hyperlink 222 associated with the payload/content tree upon the user device 104 sensing the link trigger 232 via one or more of its sensors. The nature of the link trigger 232 is not limited and may include data sensed by sensors of an electronic device such as one or more of: camera, communication interfaces (e.g. Wi-Fi® interface, Bluetooth® interface, radiofrequency (RF) interface, ultrawide band (UWB) interface, nearfield communication interface (NFC)), accelerometers, camera, ambient light sensor, proximity sensor, gyroscope, compass, hall effect sensor, barometer, and fingerprint sensors).

As a non-limiting example, a link trigger 232 may be in the form of a quick response (QR) code associated with a given deep hyperlink 222 which may cause the user device 104 scanning the QR code with a camera of the user device 104 to access the deep hyperlink 222 and transmit an indication to the API 142. As another non-limiting example, a link trigger 232 may be in the form of a near-field communication (NFC) tag that may be sensed by a NFC interface of the user device 104 and cause the user device 104 to access the given deep hyperlink 222 associated therewith.

As yet another non-limiting example, a link trigger 232 may be in the form of a specific sound that may be sensed by a microphone of the user device 104, which may cause the user device 104 to access the deep hyperlink 222 associated with a content payload.

In one or more alternative embodiments, a link trigger 232 may be an "active" link trigger which requires the user 102 to perform the sensing action, or may be a "passive" link trigger not requiring any action from the user 102 (i.e. user interaction) on the user device 104. A non-limiting example of a passive trigger would be the user 102 with the user device 104 being within a threshold distance of a link trigger 232 (e.g. Bluetooth® device or NFC reader) which may cause activation of the link trigger 232.

It is contemplated that deep hyperlinks may be accessible only to electronic devices according to certain criteria such as device type, model, unique identifier and the like. In one or more other embodiments, the user device 104 may execute an application that enables the user device 104 to sense triggers based on specific sensor data via its sensors. Thus, in such embodiments, only user devices executing the application may be configured to sense the link trigger 232.

In one or more embodiments, the user device 104 sensing the link trigger 232 and accessing the deep hyperlink 222 may not be the device executing the content payload associated with the content node 212. In one or more other embodiments, the user device 104 sensing the link trigger 232 and accessing the deep hyperlink 222 may be the device executing the content payload associated with the content node 212.

The server 140 associates the content node payload with one or more voice-activated platforms. In one or more embodiments, the server 140 receives an indication of the one or more voice-activated platforms or IVAs on which the content payload is to be executed from the content provider 132. Non-limiting examples of voice-activated platforms or IVAs include SIRI™ by APPLE™, ALEXA™ by AMAZON™, GOOGLE ASSISTANT™ by GOOGLE™, CORTANA™ by MICROSOFT™, BIXBY™ by SAMSUNG™, and ALICE™ by YANDEX™. For example, a content provider 132 may only want certain models, types or IVAs to execute content payloads.

The server 140 stores, in the database 144, in the form of key values, the content tree 210, each content node 212 comprising a content payload and being associated with a respective deep hyperlink 222 and a respective link trigger 232.

In one or more embodiments, the respective deep hyperlink 222 is transmitted to the content provider device 130. In embodiments where the server 140 generates a link trigger 232, the link trigger 232 is transmitted together with the deep hyperlink 222 to the content provider device 130.

How content payload is delivered to a smart connected device such as the smart speaker 106 will now be explained with reference to the content payload provision procedure 250.

Content Payload Provision Procedure

Once information required for delivery of content payload has been stored in the database 144 upon execution of the content tree generation procedure 200, link triggers 252 associated with specific content nodes are distributed by the content providers 132 via for example the content provider devices 130.

As a first non-limiting example, the link trigger 252 may be in the form of a QR code displayed on printed media such as a sheet, a page in a magazine, a scientific article, a poster and the like. As a second non-limiting example, the link trigger 252 may be in the form of a RF tag that may be sensed by the user device 104.

The user 102 may use the user device 104 to sense a link trigger 252, which causes the user device 104 to access the deep hyperlink 254 associated with the link trigger 252. The user device 104 accessing the deep hyperlink 254 causes transmission, to the API 142 of the server 140, over the communication network 110, data packets which are indicative of the user device 104 having activated the link trigger 252 on the user device 104.

In one or more embodiments, execution of the deep hyperlink 254 may cause display of a prompt on the user device 104 asking the user 102 on which device the user 102 wants to experience the content payload associated with the deep hyperlink 254. In some embodiments, such as when the user device 104 is linked or registered with other devices of the user 102, such as the smart speaker 106, the user 102 may be prompted to select the smart connected device.

In some embodiments, the user 102 may want to experience the content on the same device having activated or sensed the link trigger 252, e.g., the user device 104. It will be appreciated that the user 102 may have only one device on which the content payload may be experienced, or a plurality of electronic devices. In some embodiments, the content may be automatically executed without a user prompt.

In one or more embodiments, the user device 104, upon accessing the deep hyperlink 254 associated with the link trigger 252, causes transmission of an indication to the API 142 of the server 140.

The server 140 receives the indication of the deep hyperlink 254 having been accessed upon the link trigger 252 having been sensed by the user device 104.

In one embodiment, the indication of the deep hyperlink 254 comprises an API post request to the server 140, the API post request including an indication of the content payload associated with the deep hyperlink 254 and information indicative of the platform associated with the smart connected device that will execute the content payload, e.g. the IVA application 108 and the IVA functionality 122 associated with the user device 104 and/or the smart speaker 106.

The server 140 uses the database 144 to identify the correct device and the correct handler for the response to be provided. In one or more embodiments, the API post request is made to the lookup index of the database 144, which identifies the user device 104 and the correct handler for the response. The API post request includes a device type, content provider identifier, node identifier and attribution values. This enables to adapt the content payload to be executed on the specific device of the user 102.

The handler satisfies the request to the specific voice-activated device URL parameters, i.e. in this case the smart speaker 106. The handler enables to retrieve, from the database 144, the required instructions for executing the content payload 264 on the smart connected device, i.e. identifies the type of IVA application 108, IVA server 120 and/or IVA functionality 122. It will be appreciated that since different manufacturers and providers of IVAs have different protocols for structuring requests and transmitting requests to their servers, the server 140 is configured to structure request specifically adapted for the user device 104 and/or smart speaker 106 executing the IVA application 108, without the user 102 or the content provider 132 having to provide such information. As a non-limiting example, AMAZON™ and GOOGLE™ use different formats for their respective deep hyperlinks.

The server 140 receives the key values which identify the content payload 264 associated with the deep hyperlink 254.

The server 140 initiates tracking of the content payload, i.e. the server 140 stores, in the database 144, an indication that the deep hyperlink 254 and content payload 264 has been accessed by the user device 104 together with a timestamp, and is configured to track and store user interactions with the content payload. An API fetch request is then performed to the database 144, the API fetch request including an indication of a device type, content provider identifier, node identifier and attribution values.

The server 140 transmits a request including the content payload 264 (or an indication thereto) and device identifier to the IVA functionality 122 of the IVA server 120. The IVA functionality 122 of the IVA server 120 processes the request and transmits the playable content payload 274 to the smart speaker 106 and/or the user device 104, which causes the smart speaker 106 and/or the user device 104 to execute the playable content payload 274. The playable content payload 274 may be provided in the form of a natural dialogue with the user 102.

In response to the playable content payload 274 executed by the smart speaker 106, the user 102 may then provide a sound indication to the smart speaker 106, which is processed by the IVA application 108. The processed sound indication may for example correspond to an answer to a question asked by the playable content payload 274. The answer may correspond for example to an option or children node associated with the specific playable content payload 274.

The processed sound indication may then be transmitted to the API 142 of the server 140, in response to which the server 140 may provide another content payload (not shown), for example content payload from a children node of the node associated with the deep hyperlink 254.

The server 140 receives the processed sound indication from the IVA server 120. The server 140 identifies the content tree, content node and device associated with the processed sound indication and retrieves, from the database 144, the new content payload that may be provided to the user 102 of the user device 104 and/or the smart speaker 106. In one or more embodiments, the server 140 identifies the new content payload based on the tracking of the previously provided content payload 264.

The server 140 transmits another request including the new content payload and device identifier to the IVA functionality 122 of the IVA server 120. The IVA functionality 122 of the IVA server 120 processes the request and transmits the new content payload to the smart speaker 106 and/or the user device 104, which causes the smart speaker 106 and/or the user device 104 to execute the new content payload. The new content payload may be provided in the form of a spoken utterance to the user 102. The user 102 may then continue interacting with the smart speaker 106 by providing other spoken utterances.

The server 140 tracks the user interactions of the IVA application 108, which are stored in the database 144 together with an indication of the content payload, timestamps, actions performed by the user 102, and the like. The tracked user interactions may enable the user 102 for example to resume his interactions with the content tree associated with the last content payload he or she has interacted with.

As a non-limiting example, the content payload 264 may correspond to a 'beverages' subsection of a menu of a restaurant, which may be a child node in a content tree representing the menu of the restaurant, and the user 102 may provide a choice of a beverage, which corresponds to a child node of the beverages subsection, and the other content payload may then provide a choice between 'regular' and 'diet' versions of the chosen beverage.

As another non-limiting example, the content payload 264 may correspond to a 'chair' subsection of a menu of a home goods company, which may be a child node in a content tree representing the 'furniture' of the store, and the user 102 may provide a choice of a 'chair', which corresponds to a child node of the 'furniture' subsection, and the other content payload may then provide a choice between 'desk chair' and 'wing back'

As another non-limiting example, the content payload 264 may correspond to a 'questionnaire' subsection of a company website, which may be a child node in a content tree representing the navigation of the website, and the user 102 may dialogue with the IVA (ie. "you've accessed the questionnaire, do you wish to continue?", "yes."), which corresponds to a child node of the 'questionnaire' subsection, and the other content payload may then provide more opportunities for the user to respond to questions.

As another non-limiting example, the content payload 264 may correspond to a 'paywall transaction' subsection of a webpage, which may be a child node in a content tree representing the navigation of a webpage, and the user 102 may provide a choice whether they want to pay for access behind a paywall or not, which corresponds to a child node of the 'paywall transaction' subsection, and the other content payload may then provide a choice between 'paywall content' and 'free content' versions of the content experience.

Method Description

Figure 4:
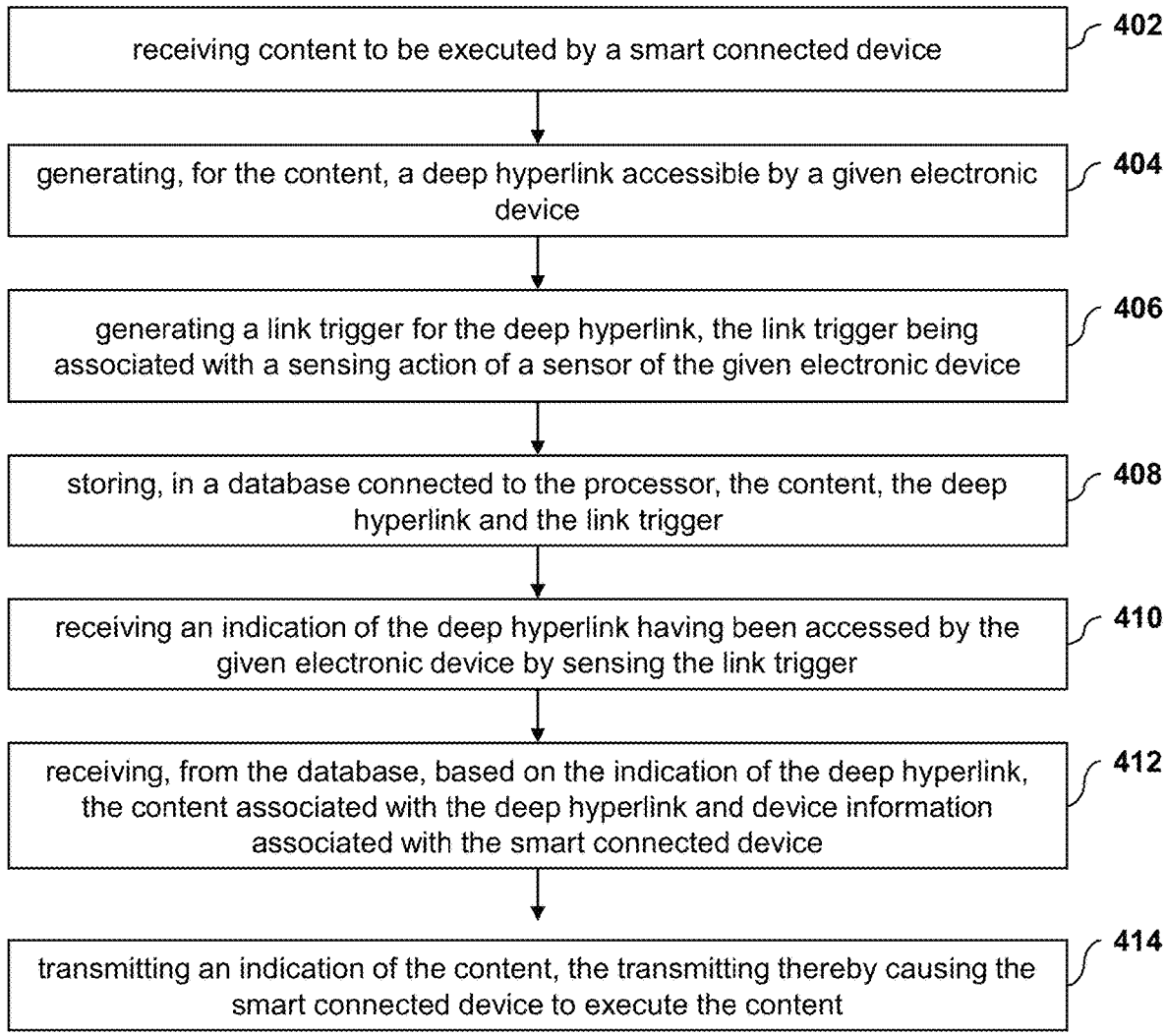
FIG. 4 depicts a flow chart of a method for causing a smart connected device to execute content upon sensing a link trigger in accordance with one or more non-limiting embodiments of the present technology.

FIG. 4 depicts a flowchart of a method 400 for causing a smart connected device to execute content upon sensing a link trigger, the method 400 being executed in accordance with one or more non-limiting embodiments of the present technology.

The method 400 is executed by at least one processor. In one or more other embodiments, the method 400 may be executed by the server 140.

In one or more embodiments, the server 140 comprises a processing unit or processor such as a central processing unit (CPU) and/or a graphics processing unit (GPU) operatively connected to a non-transitory storage medium such as the solid-state drive and/or the random-access memory, the non-transitory storage medium storing computer-readable instructions. The processor, upon executing the computer-readable instructions, is configured to or operable to execute the method 400.

The method 400 begins at processing step 402.

According to processing step 402, the processor receives content to be executed by a smart connected device. The content to be executed by a smart connected vice such as the smart speaker 106 may be in the form of at least one content node 212 in a content tree 210. Each content node 212 is associated with a content provider identifier, a space identifier, a node identifier, a media type, a device type, and a parent node identifier.

In one or more embodiments, the server 140 may provide a graphical user interface which may be used by a content provider 132 to organize and transmit content to be executed by the smart speaker 106. The content tree corresponds to a hierarchical data structure, and specific content may correspond to a content node 212 in the content tree 210.

According to processing step 404, the processor generates, based on the content, a deep hyperlink 222 associated with the content to be executed by the smart connected device. In one or more embodiments, the processor generates a deep hyperlink 222 for each content node 212 of the content tree 210.

According to processing step 406, the processor generates a link trigger 232 for a given deep hyperlink 222. A link trigger 232 causes a user device such as the user device 104 to access the deep hyperlink 222 associated with the payload/content tree upon the user device 104 sensing the link trigger via one or more of its sensors.

According to processing step 408, the processor stores the content tree 210, the deep hyperlink 222 and the link trigger 232 in the database 144. In one or more embodiments, content nodes 212 of the content tree 210, the deep hyperlink 222 and the link trigger 232 are stored as key values in the database 144.

According to processing step 410, the processor receives an indication of the deep hyperlink 254 having been accessed upon the link trigger 252 having been sensed or activated by the user device 104.

In one or more embodiments, the indication may be received from the user device 104 or from another electronic device connected to the server 140.

According to processing step 412, the processor receives, based on the indication of the deep hyperlink 254, the content 264 associated with the deep hyperlink 254 and the device information associated with the smart device which will execute the content payload. In one or more embodiments, the processor receives an indication of the content from the database 144.

According to processing step 414, the processor transmits an indication of the content, the transmission of the indication of the content thereby causing the smart connected device to execute the content payload.

In one or more embodiments, the processor transmits a request including the content payload 264 and device identifier to the IVA functionality 122 of the IVA server 120. The IVA functionality 122 of the IVA server 120 processes the request and transmits the playable content payload 274 to the smart speaker 106 and/or the user device 104, which causes the smart the smart speaker 106 and/or the user device 104 to execute the playable content payload 274.

Thus, the user 102 may interact with content and navigate the content tree 212 provided by the content provider 132 via voice activation. Processing steps 410-412 may be executed repeatedly for different content nodes in the content tree 212 upon receiving user interactions (e.g., voice commands) and until a termination condition is satisfied.

The method 400 then ends.

It should be expressly understood that not all technical effects mentioned herein need to be enjoyed in each and every embodiment of the present technology. For example, embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

What is claimed is:

1. A method for causing a smart connected device to execute content, the method being executed by at least one processor, the method comprising:
   receiving an indication of the content to be executed by the smart connected device;
   generating, for the content, a deep hyperlink accessible by a given electronic device;
   generating a link trigger for the deep hyperlink, the link trigger being associated with a sensing action of a sensor of the given electronic device;
   storing, in a database connected to the processor, an indication of the content, the deep hyperlink and the link trigger;
   receiving an indication of the deep hyperlink having been accessed by the given electronic device by sensing the link trigger;
   receiving, based on the indication of the deep hyperlink, from the database, the content associated with the deep hyperlink and device information associated with the smart connected device; and
   transmitting the indication of the content, the transmitting thereby causing the smart connected device to execute the content based at least on the device information.

2. The method of claim 1, wherein the content is part of a content tree corresponding to a hierarchical data structure, the content corresponding to a content node in the content tree.

3. The method of claim 2, wherein
   the at least one processor is connected to a content provider device; and wherein the receiving the content to be executed by the smart connected device comprises receiving, from the content provider device, the content to be executed by the smart connected device.

4. The method of claim 3, further comprising, prior to receiving the content:
providing a graphical user interface (GUI) to the content provider device for receiving the indication of the content.

5. The method of claim 4, wherein
the content tree is organized as a question and answer dialogue; and
wherein the content corresponds to a given question in the content tree.

6. The method of claim 5, further comprising, prior to generating, for the content, the deep hyperlink accessible by the given electronic device:
generating the content node in the content tree, the content node being associated with a content provider identifier, a space identifier, a node identifier, a media type, a device type, and a parent node identifier; and wherein
storing the content comprises storing the content node as a key value in the database.

7. The method of claim 6, wherein
the processor is connected to a server associated with the smart connected device; and wherein
the transmitting the indication of the content comprises:
transmitting an indication of the smart connected device to the server, the transmission causing the server to process the content to obtain executable content and to relay the executable content to the smart connected device.

8. The method of claim 7, wherein the smart connected device comprises a smart speaker.

9. The method of claim 8, wherein the sensor comprises at least one of: an input/output sensor, a camera, a communication interface, an accelerometer, an ambient light sensor, a proximity sensor, a gyroscope, a compass, a hall effect sensor, a barometer, and a fingerprint sensor.

10. The method of claim 9, wherein the receiving the indication of the deep hyperlink having been accessed by the given electronic device by sensing the link trigger comprises receiving an indication of a smart connected device type.

11. The method of claim 10, further comprising:
tracking user interactions of the smart connected device with the content; and
storing, in the database, the user interactions.

12. A system for causing a smart connected device to execute content, the system comprising:
at least one processor; and
a non-transitory storage medium operatively connected to the at least one processor, the non-transitory storage medium storing computer-readable instructions;
the processor, upon executing the computer-readable instructions, being configured for:
receiving an indication of the content to be executed by the smart connected device;
generating, for the content, a deep hyperlink accessible by a given electronic device;
generating a link trigger for the deep hyperlink, the link trigger being associated with a sensing action of a sensor of the given electronic device;
storing, in the non-transitory storage medium, the content, the deep hyperlink and the link trigger;
receiving an indication of the deep hyperlink having been accessed by the given electronic device by sensing the link trigger;
receiving, based on the indication of the deep hyperlink, from the non-transitory storage medium, the content associated with the deep hyperlink and device information associated with the smart connected device; and
transmitting the indication of the content, the transmitting thereby causing the smart connected device to execute the content.

13. The system of claim 12, wherein the content is part of a content tree corresponding to a hierarchical data structure, the content corresponding to a content node in the content tree.

14. The system of claim 12, wherein
the processor is connected to a content provider device; and wherein
the receiving the content to be executed by the smart connected device comprises receiving, from the content provider device, the content to be executed by the smart connected device.

15. The system of claim 14, wherein the processor is further configured for, prior to receiving the content:
providing a graphical user interface (GUI) to the content provider device for receiving the indication of the content.

16. The system of claim 15, wherein
the content tree is organized as a question and answer dialogue; and wherein
the content corresponds to a given question in the content tree.

17. The system of claim 16, wherein the processor is further configured for, prior to the generating, for the content, the deep hyperlink accessible by the given electronic device:
generating the content node in the content tree, the content node being associated with a content provider identifier, a space identifier, a node identifier, a media type, a device type, and a parent node identifier; and wherein
storing the content comprises storing the content node as a key value in the non-transitory storage medium.

18. The system of claim 17, wherein
the processor is connected to a server associated with the smart connected device; and wherein
the transmitting the indication of the content comprises:
transmitting an indication of the smart connected device to the server, the transmission causing the server to process the content to obtain executable content and to relay the executable content to the smart connected device.

19. The system of claim 18, wherein the smart connected device comprises a smart speaker.

20. The system of claim 19, wherein the sensor comprises at least one of: an input/output sensor, a camera, a communication interface, an accelerometer, an ambient light sensor, a proximity sensor, a gyroscope, a compass, a hall effect sensor, a barometer, and a fingerprint sensor.

* * * * *